(12) United States Patent
Wu et al.

(10) Patent No.: US 12,663,322 B2
(45) Date of Patent: Jun. 23, 2026

(54) HEATING ADIABATIC CALORIMETER AND METHODS OF USE

(71) Applicant: OmniCal, Inc., Stafford, TX (US)

(72) Inventors: Frank L. Wu, Stafford, TX (US); Jeff H. Wu, Stafford, TX (US)

(73) Assignee: OmniCal, Inc., Stafford, TX (US)

( * ) Notice: Subject to any disclaimer, the term of this patent is extended or adjusted under 35 U.S.C. 154(b) by 0 days.

(21) Appl. No.: 18/990,329

(22) Filed: Dec. 20, 2024

(65) Prior Publication Data

US 2025/0123160 A1     Apr. 17, 2025

Related U.S. Application Data

(63) Continuation-in-part of application No. 18/425,768, filed on Jan. 29, 2024, now abandoned.

(Continued)

(51) Int. Cl.
| | |
|---|---|
| *G01K 17/00* | (2006.01) |
| *G01N 25/48* | (2006.01) |
| *H05B 1/02* | (2006.01) |

(52) U.S. Cl.
CPC ......... *G01K 17/00* (2013.01); *G01N 25/4826* (2013.01); *H05B 1/0247* (2013.01)

(58) Field of Classification Search
CPC ... G01K 17/00; G01N 25/4826; H05B 1/0247

(Continued)

(56) References Cited

U.S. PATENT DOCUMENTS

| | | | | |
|---|---|---|---|---|
| 3,834,873 A | * | 9/1974 | Picker | G01N 25/00 |
| | | | | 137/829 |
| 4,166,385 A | * | 9/1979 | Pate | G01N 25/50 |
| | | | | 422/51 |

(Continued)

FOREIGN PATENT DOCUMENTS

| | | | | |
|---|---|---|---|---|
| CN | 101799439 A | * | 8/2010 | G01K 17/00 |
| CN | 106093112 A | * | 11/2016 | |

(Continued)

OTHER PUBLICATIONS

U.S. Appl. No. 18/990,329, filed Feb. 11, 2025_CN_101799439_A_H.pdf,Aug. 11, 2010.*

(Continued)

*Primary Examiner* — Peter J Macchiarolo
(74) *Attorney, Agent, or Firm* — Polsinelli PC

(57) ABSTRACT

An apparatus and method for initiating thermochemical events in an adiabatic reaction calorimeter are provided. The apparatus and method may be used in safety research of lithium battery and reactive chemical thermal runaways. The apparatus comprises a motor-driven conductive heating element in thermal contact with the outer surface of the reaction in the sample container for heat transfer during heating ramp. The heating element is heated and coupled to the sample container to initiate thermal runaway and decoupled once thermal runaway is initiated, which is much faster than many existing slow heating methods used to initiate thermal runaway. Alternatively, when the heating element is kept attached until the completion of the thermal event, a power-compensation DSC curve is resulted.

19 Claims, 10 Drawing Sheets

Related U.S. Application Data

(60) Provisional application No. 63/506,980, filed on Jun. 8, 2023.

(58) Field of Classification Search
USPC ......................... 374/32, 34; 422/51; 436/147
See application file for complete search history.

(56)     References Cited

U.S. PATENT DOCUMENTS

| | | | | | |
|---|---|---|---|---|---|
| 4,892,707 | A | * | 1/1990 | Stockton | G01N 25/4846 |
| | | | | | 374/33 |
| 6,988,826 | B2 | * | 1/2006 | Zribi | B82Y 15/00 |
| | | | | | 374/10 |
| 8,740,453 | B2 | * | 6/2014 | Torniainen | B01L 3/50273 |
| | | | | | 374/31 |
| 8,926,172 | B2 | * | 1/2015 | Wu | G01N 25/4826 |
| | | | | | 374/34 |
| 9,857,241 | B2 | * | 1/2018 | Danley | G01K 17/08 |
| 2005/0008063 | A1 | * | 1/2005 | Chippett | G01N 25/26 |
| | | | | | 374/34 |
| 2010/0135870 | A1 | * | 6/2010 | Mizuno | C01B 3/342 |
| | | | | | 422/198 |
| 2011/0313713 | A1 | * | 12/2011 | Hoult | G01N 25/486 |
| | | | | | 702/136 |
| 2024/0410845 | A1 | * | 12/2024 | Wu | G01N 25/4826 |
| 2025/0123160 | A1 | * | 4/2025 | Wu | G01N 25/4826 |

FOREIGN PATENT DOCUMENTS

| | | | | | | |
|---|---|---|---|---|---|---|
| CN | 109974899 | A | * | 7/2019 | | |
| CN | 112540102 | A | * | 3/2021 | ......... | G01N 25/4806 |
| CN | 114397529 | A | * | 4/2022 | | |
| JP | 2005147928 | A | * | 6/2005 | ......... | G01N 25/4826 |
| JP | 2012533067 | A | * | 12/2012 | | |
| RU | 2713808 | C1 | * | 2/2020 | | |
| WO | WO-9960356 | A1 | * | 11/1999 | ............ | G01K 17/00 |

OTHER PUBLICATIONS

U.S. Appl. No. 18/990,329, filed Feb. 11, 2025_RU_2713808_C1_H.pdf,Feb. 7, 2020.*

U.S. Appl. No. 18/990,329, filed Feb. 11, 2025_WO_9960356_A1_H.pdf, Nov. 25, 1999.*

U.S. Appl. No. 18/990,329, filed Feb. 12, 2025_JP_2005147928_A_H.pdf,Jun. 9, 2005.*

U.S. Appl. No. 18/990,329, filed Feb. 12, 2025_JP_2012533067_A_H.pdf,Dec. 20, 2012.*

U.S. Appl. No. 18/990,329, filed Feb. 13, 2025_CN_106093112_A_H.pdf,Nov. 9, 2016.*

U.S. Appl. No. 18/990,329, filed Feb. 13, 2025_CN_109974899_A_H.pdf,Jul. 5, 2019.*

U.S. Appl. No. 18/990,329, filed Feb. 13, 2025_CN_114397529_A_H.pdf,Apr. 26, 2022.*

U.S. Appl. No. 18/990,329, filed Feb. 25, 2025_CN_112540102_A_H.pdf,Mar. 23, 2021.*

* cited by examiner 114, 116

HEATING ADIABATIC CALORIMETER AND METHODS OF USE

CROSS-REFERENCE TO RELATED APPLICATION

This application is a continuation-in-part application of U.S. patent application Ser. No. 18/425,768 filed Jan. 29, 2024, which claims priority under 35 U.S.C. § 119(e) from U.S. Patent Application No. filed 63/506,980 filed Jun. 8, 2023, titled "Attach/Detach Heating Adiabatic calorimeter and Methods of Use," the entire contents of each is incorporated herein by reference for all purposes.

TECHNICAL FIELD

The disclosure relates generally to the field of adiabatic calorimeter devices and methods of operation, and more particularly to an accelerating rate calorimeter with an attach/detach heating element.

BACKGROUND

Calorimetry is a universal analytical method that measures heat or heat release rate from a biological, chemical or physical sample or process. calorimetry is a useful technique for measuring material properties, molecular interactions, and reaction kinetics.

Adiabatic calorimetry has been used for physical property measurement (e.g., specific heat and phase transfer studies) and reaction process monitoring (e.g., chemical reaction upon mixing or decomposition upon temperature rise). More recently, adiabatic calorimeters have been used to measure temperature and pressure as a function of time to look at undesired chemical reactions. When chemical mixing, reaction or decomposition becomes exothermic, the heat released from the sample may cause a significant temperature excursion, and sometimes develop into a self-perpetuated, thermal runaway reaction.

Thermal hazards of reactive chemicals have been a major issue in chemical manufacturing processes. Many exothermic reactions cause temperatures to rise rapidly and uncontrollably, leading to energetic venting and/or fire and explosions. Adiabatic reaction calorimetry and related thermokinetic analysis have been proved to be the primary test tool and technique for thermal hazard assessment.

Thermal runaway reactions can be studied by using either an accelerating rate calorimeter (ARC) or a differential accelerating rate calorimeter (dARC). Using these calorimeters, a sample and a sample container are heated to a temperature where exothermic activity is detected. Upon the detection of an exotherm, the reaction is allowed to self-propel to its final temperature, pseudo-adiabatically in ARC or fully-adiabatically in dARC. A heat-wait-search (HWS) temperature-step process has been used to initiate and determine the onset of an exothermic runaway reaction.

Heat-wait-search is a measurement mode used in calorimeter devices according to ARC. HWS is the term for a sequence that heats the sample to a distinct temperature (heat), allows thermal stabilization of the system (wait), and finally detects (search) if there is an increase in the sample temperature detected which is caused by the exothermic decomposition reaction of the sample. In case an exothermic self-heating is detected, the calorimeter device changes its mode from HWS to adiabatic.

However, conventional HWS approaches to detect a runaway reaction onset temperature are very time consuming (for example exceeding 12 hours), with either the radiant heater of traditional ARC (accelerating rate calorimeter) or the attached heater of advanced dARC (differential accelerating rate calorimeter). Also, no endothermic event and energy can be detected and measured by using either ARC or dARC, which significantly hinders the data interpretation of reaction events and mechanistic.

BRIEF DESCRIPTION OF THE DRAWINGS

Further features of the present disclosure will become apparent to those skilled in the art to which the present disclosure relates from reading the following specification with reference to the accompanying drawings, in which.

DETAILED DESCRIPTION

Figure 1A:
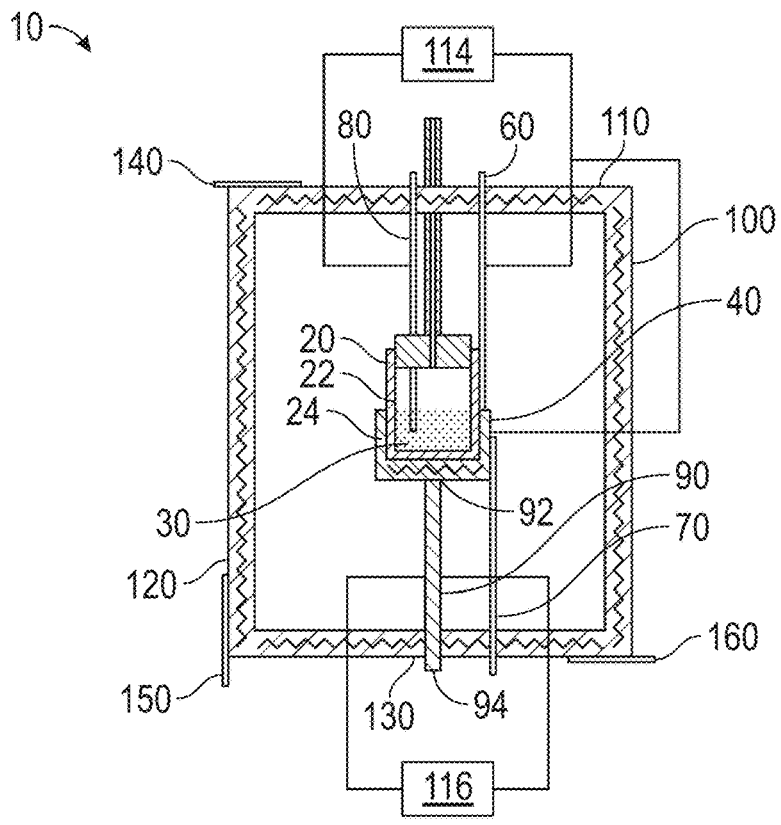
FIG. 1A is a cross-sectional view of a calorimeter with the heating element attached to the sample container.
Figure 1B:
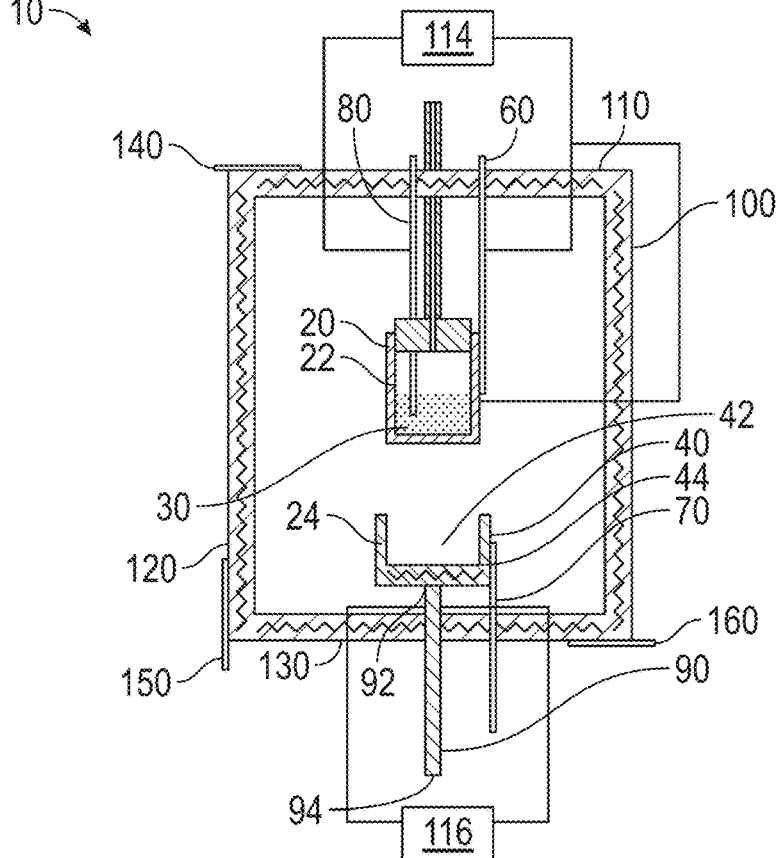
FIG. 1B is a cross-sectional view of a calorimeter with the heating element detached to the sample container.

Various examples of the present technology are discussed in detail below. While specific implementations are discussed, it should be understood that this is done for illustration purposes only. A person skilled in the relevant art will recognize that other components may be used without parting from the spirit and scope of the present technology.

Several definitions that apply throughout this disclosure will now be presented.

As used herein, the terms "a," "an," "the," and "said" means one or more. As used herein, the term "and/or," when used in a list of two or more items, means that any one of the listed items can be employed by itself, or any combination of two or more of the listed items can be employed.

For example, if a composition is described as containing components A, B, and/or C, the composition can contain A alone; B alone; C alone: A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject. The term "comprising" means "including, but not necessarily limited to"; it specifically indicates open-ended inclusion or membership in a so-described combination, group, series and the like.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "simultaneously" means occurring at the same time or about the same time, including concurrently.

The term "coupled" is defined as connected, whether directly or indirectly through intervening components, and is not necessarily limited to physical connections. The connection can be such that the objects are permanently connected or releasably connected.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The present disclosure describes an apparatus for sample temperature control. The apparatus may be a new accelerating rate calorimeter that uses a heating element for sample temperature control. A controller can determine whether a thermal event includes a thermal reaction or a thermal runaway. A thermal reaction can include an endothermic event and/or an exothermic event.

In the cases of a thermal reaction, the heating element can continue providing heat to a sample container. In some examples, the heating element can reduce the amount of heat provided to the sample container to substantially sustain a linearity of a temperature ramp until the thermal event is complete.

In the cases of a thermal runaway, the controller can control the heating element to (1) either turn off to stop providing heat to the sample container, and/or (2) transition to a detach configuration. In the cases of the thermal runaway, the runaway reaction (e.g., the heating power) can be allowed to depart from a programmed temperature ramp and self-propel to reaction completion.

In some examples, the heating element can be operable to transition between an attach configuration where the heating element is in thermal contact with a sample container and a detach configuration where the heating element is not in thermal contact. For example, the heating element can be moved in relation to the sample container to transition the heating element between the attach and detach configurations (e.g., heating and non-heating configurations). In some examples, the sample container can be moved in relation to the heating element so that the heating element transitions between the attach and detach configuration. By using the compensating heat element, the time required for reaction initiation from start to onset of the reaction can be significantly reduced to a few hours and the onset of reaction can be detected at much lower temperatures. In addition, with the linear compensating heat ramps, heat capacities of sample and sample container may be determined simultaneously in a single experiment which enables a quicker hazard assessment of maximum energy release of the runaway reaction.

Thermal runaway may occur in situations where an increase in temperature changes the conditions in a way that causes a further increase in temperature, often leading to a destructive result. Thermal runaway is a type of uncontrolled positive feedback. In chemical applications, thermal runaway is associated with strong exothermic reactions that are accelerated by an increase in temperature. In electrical applications, thermal runaway is associated with increased current flow and power dissipation. For example, a cell may reach a thermal runaway when its temperature rises uncontrollably at a rate greater than 20° C./min with maximum temperatures reaching greater than 300° C. accompanied by gas and/or electrolyte venting, smoke or fire or a combination of all.

Thermal runaway may occur to battery cells, such as lithium-ion (Li-ion) cells. It may be desirable to be able to test battery cells, while rapidly triggering the battery cells into thermal runaway, to determine the fraction of energy that dissipates via conduction through the can of a battery cell versus the fraction of energy that is released in the form of ejecta.

The power-compensation reaction accelerating rate calorimeter 10 are shown in FIGS. 1A-I. In some examples, the calorimeter 10 includes a motor-driven device with a thermally conductive resistive heating element that is operable to attach (FIG. 1A, 1C, 1E, 1G)/detach (FIG. 1B, 1D, 1F, 1H) from a sample 30 and/or a sample container 20.

As shown in FIGS. 1A-1H, the calorimeter 10 can include: the sample container 20, the sample 30 at least partially received in the sample container 20, a heating element 40, an adiabatic chamber 100 disposed around the sample container 20 with a chamber-temperature-control system, a first temperature sensor 70, a second temperature sensor 80, and/or a controller 114, 116. The controller 114, 116 can include a temperature controller 114 and/or a motion controller 116. The controller 114, 116 can be coupled with one or more temperature sensors and/or the heating element 40. The temperature controller 114 can be operable to control receive temperature measurements (e.g., temperature of the sample 30, temperature of the sample container 20, and/or temperature of the heating element 40). The motion controller 116 can be operable to move either the sample container 20 and/or the heating element 40, for example to create distance between the sample container 20 and the heating element 40 and/or to bring the sample container 20 and the heating element 40 together in thermal contact. In some examples, the temperature controller 114 can be operable to control the amount of heat that the heating element 40 transmits to the sample 30 and/or the sample container 20. While the disclosure discusses both a temperature controller 114 and a motion controller 116 as separate controllers, in some examples, the temperature controller 114 and the motion controller 116 can be incorporated with the same controller 114, 116.

The sample container 20 may be made from any suitable materials for the desired sample conditions (e.g., temperature, pressure, chemical composition, etc.). Suitable materials for the sample container 20 include, but are not limited to, various metals such as stainless steels, titanium alloys, Monel™ alloys, Hastelloy C™ alloys and combinations thereof. The sample container 20 is adapted to receive and contain a reactive chemical sample 30. In at least one example, the sample container 20 is closed during operation of the calorimeter. The sample container 20 can be operable to receive the sample 30. The sample 30 can include any suitable biological, chemical, or physical process. The process can be exothermic or endothermic. For example, as shown in FIGS. 1G-1I, a suitable sample 30 may include a battery.

Figure 1C:
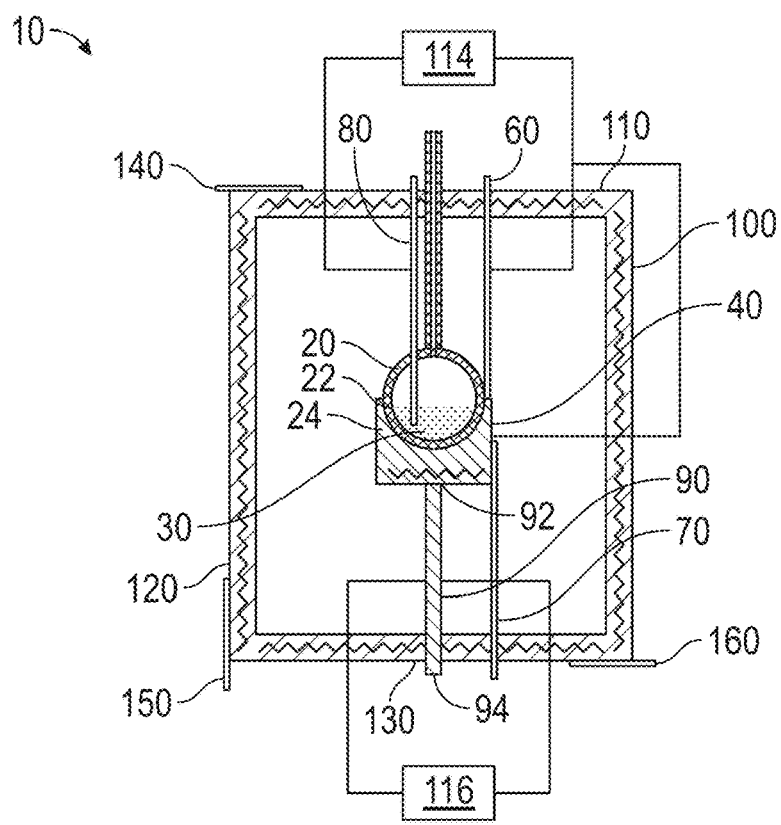
FIG. 1C is a cross-sectional view of a calorimeter with the heating element attached to the sample container.
Figure 1D:
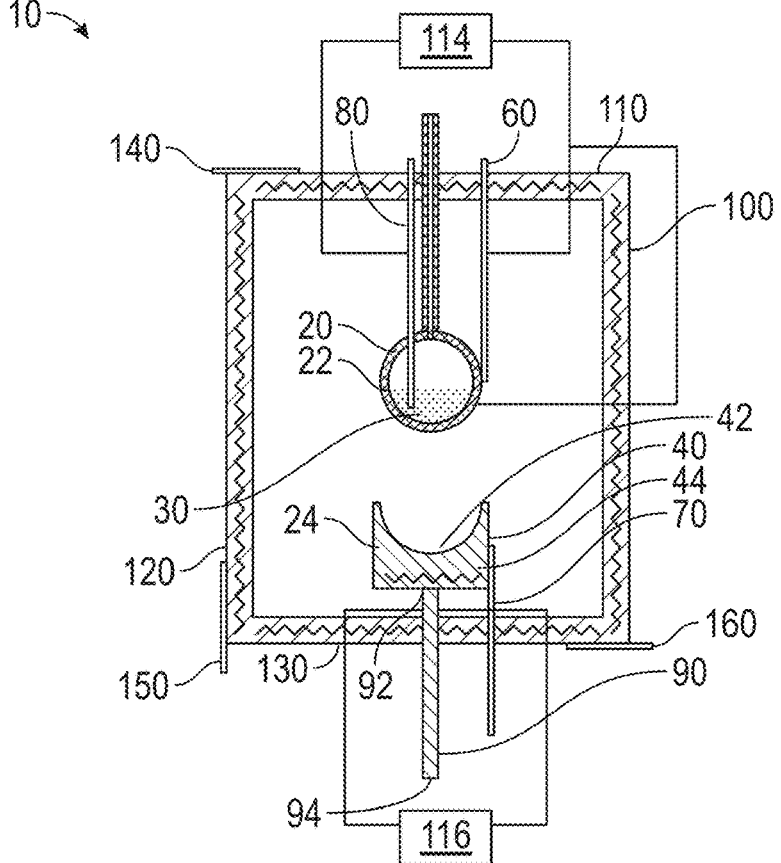
FIG. 1D is a cross-sectional view of a calorimeter with the heating element detached to the sample container.
Figures 1E, 1F:
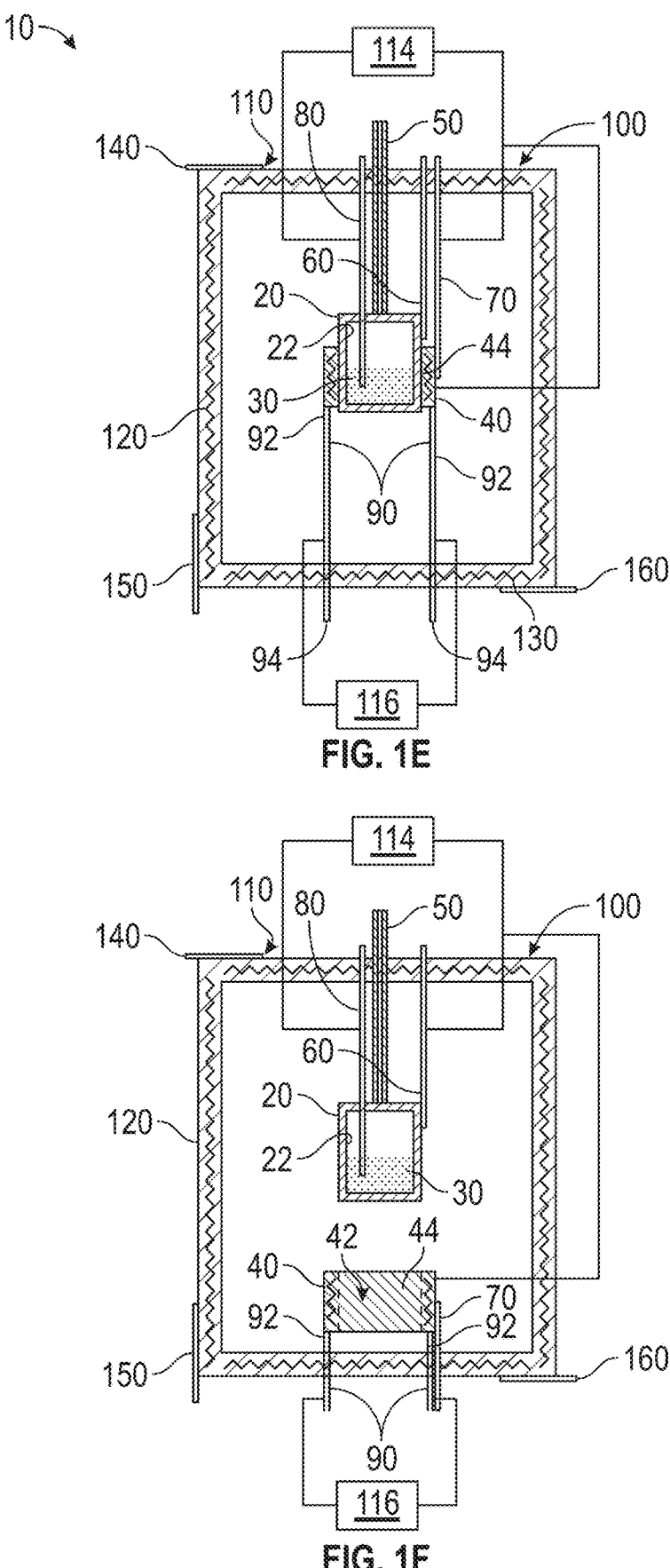
FIG. 1E is a cross-sectional view of a calorimeter with the heating element attached to the sample container.
FIG. 1F is a cross-sectional view of a calorimeter with the heating element detached to the sample container.
Figure 1G:
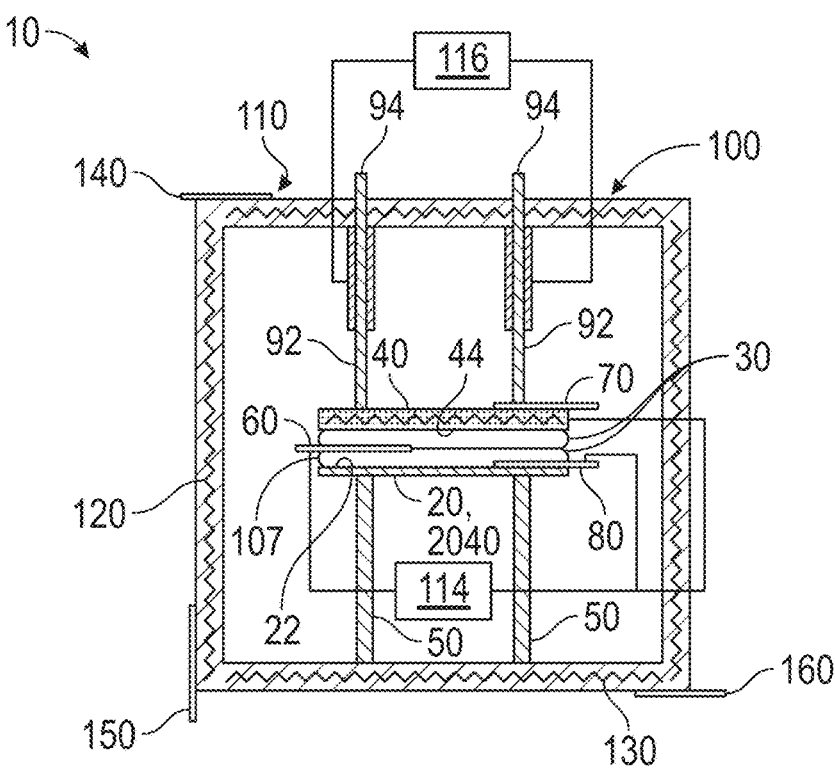
FIG. 1G is a cross-sectional view of a calorimeter with the heating element attached to the sample container.
Figure 1H:
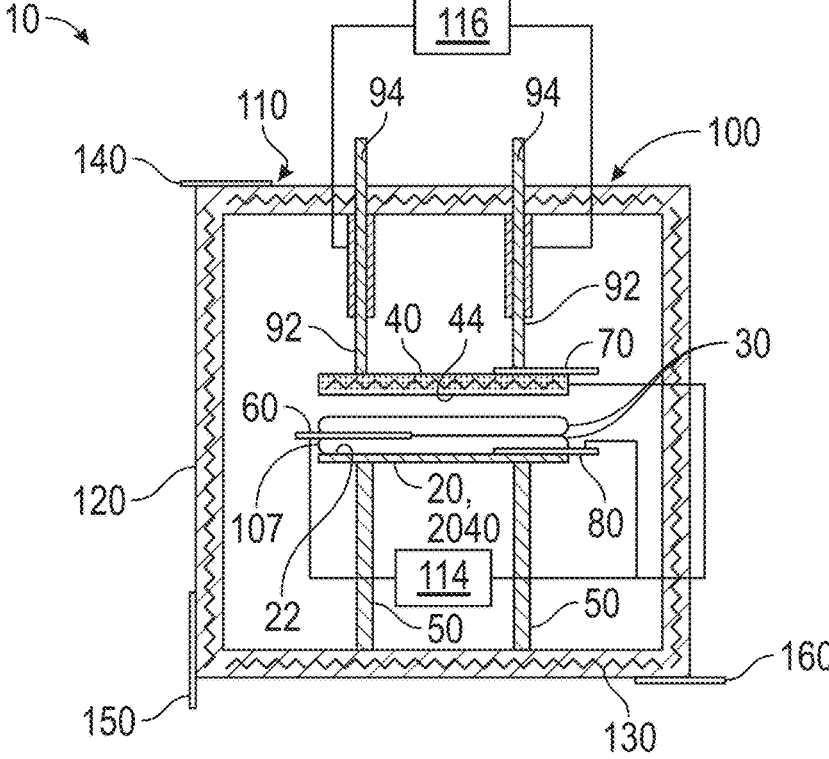
FIG. 1H is a cross-sectional view of a calorimeter with the heating element detached to the sample container.
Figure 1I:
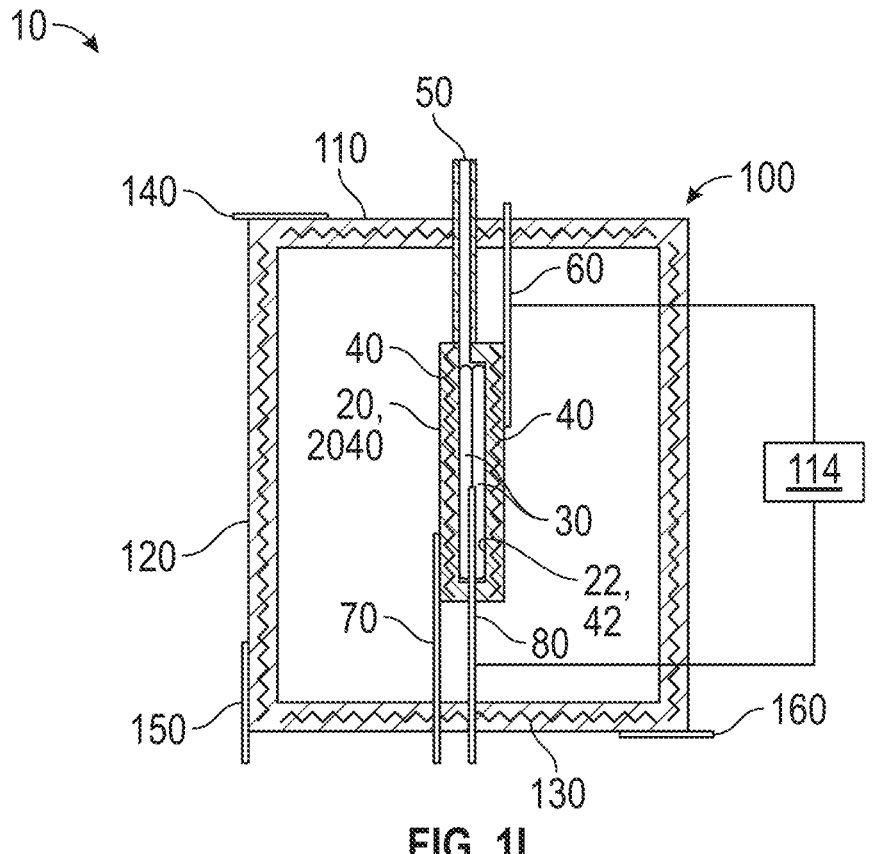
FIG. 1I is a cross-sectional view of a calorimeter with the heating element being included as part of the sample container.

While the disclosure discusses a sample container 20, in some examples as illustrated in FIGS. 1G-1I, the sample container 20 can include a battery cell.

In some examples, where the sample 20 includes a battery as illustrated in FIGS. 1G-1H, the sample container 20 can include a support plate 2040. For example, the sample 30 can be positioned on top of the support plate 2040. In some examples, the sample 30 can be received in the support plate 2040. In some examples, as illustrated in FIG. 1I, the support container 2040 can be operable to receive the sample 30 therein. Accordingly, at least a portion of the sample 30 is received in the support container 2040 such that the support container 2040 at least partially surrounds the sample 30.

In at least one example, the sample 30 and/or the sample container 20 can be supported by (e.g., hung on, coupled with, positioned on, received by, etc.) one or more supports 50. The support(s) 50 can be operable to maintain the position of the sample 30 and/or the sample container 20. In some examples, the support(s) 50 can be operable to move the sample 30 and/or the sample container 20.

In at least one example, the sample container 20 is disposed within an adiabatic chamber 100. Referring to FIGS. 1A-1I, the sample container 20 includes an inner surface 22 and an outer surface 24.

In some examples, the sample container 20 and/or the support container 2040 can be operable to be pressure sealed. The sample container 20 and/or the support container 2040 can have dimensions between about 100 millimeters length by about 70 millimeters width by about 7 millimeters depth to about 1000 millimeters length by about 700 millimeters width by about 70 millimeters depth.

Referring to FIGS. 1A-1I, the adiabatic chamber 100 includes a top plate 110, a side wall 120, and a bottom plate 130. The top plate 110, side wall 120, and bottom plate 130 are disposed around the sample container 20. In other words, the sample container 20 is disposed within top plate 110, side wall 120, and bottom plate 130 of the adiabatic chamber 100. The top plate 110, the side wall 120 and the bottom plate 130 may be made of any suitable material for the desired temperature range. The outer surface of the adiabatic chamber 100 can be covered with a layer of insulation. The insulation includes any suitable high efficiency insulation materials for the desired temperature range. In at least one example, the insulation material can include a high temperature insulation material. In at least one example, the chamber 100 can be closed during operation of the calorimeter 10.

The chamber-temperature-control system can include a top plate heater 140 coupled to the top plate 110; a side wall heater 150 coupled to the side wall 120; and a bottom plate heater 160 coupled to the bottom plate 130. The chamber-temperature-control system can control the temperature of the top plate 110, the side wall 120, and the bottom plate 130 individually to achieve a uniform temperature inside the chamber 100.

The top plate heater 140, the side wall heater 150, and the bottom plate heater 160 can include any suitable heater technology. In at least one example, the top plate heater 140, the side wall heater 150, and the bottom plate heater 160 can include an AC or DC band heater and/or a silicon rubber heater. The top plate heater 140, the side wall heater 150, and the bottom plate heater 160 may be attached to the top plate 110, the side wall 120, and the bottom plate 130, respectively, using any means appropriate for the specific heater. In at least one example, the top plate heater 140, the side wall heater 150, and the bottom plate heater 160 may be attached to an outside surface of the top plate 110, the side wall 120 and the bottom plate 130, respectively. For example, a band heater may be clamped to an outer surface, and a silicon rubber heater may be glued to the outer surface using an adhesive recommended by the heater manufacturer. In some examples, a cartridge heater may be imbedded into the outer surface of the sample container 20.

The heating element 40 can include an inner surface 44 and a recess receiving portion 42 operable to receive the sample container 20. As illustrated in FIGS. 1A-1D, the recess receiving portion 42 of the heating element 40 can be operable to receive the sample container 20, with a heating wire embedded in a bottom of the heating element 40. In some examples, as illustrated in FIGS. 1E-1F, the heating element 40 can be shaped as a heater ring, which can provide an improved heat distribution to the sample 30 inside the sample container 20, as the heating element 40 is able to provide heat along a greater surface area across the sample container 20. In some examples, as illustrated in FIGS. 1G-1H, for example where the sample 30 includes a battery which is received on a support container 2040, the heating element 40 can be substantially planar. In some examples, as illustrated in FIG. 1I, the heating element 40 can be embedded within and/or coupled with the support container 2040, where the sample 30 is received in the support container 2040.

The heating element 40 can include any suitable heater technology. In at least one example, the sample compensation heater 40 includes a light-weight differential compensation heater. The heating element 40 can be operable to transition between an attached configuration (as shown in FIGS. 1A, 1C, 1E, and 1G) and a detached configuration (as shown in FIGS. 1B, 1D, 1F, and 1H). In at least one example, in the attached configuration, the heating element 40 may be coupled to and/or be in contact with the outside surface of the sample container 20 such that the heating element 40 is in thermal contact with the sample container 20. Accordingly, heat can be passed from the heating element 40 to the sample container 20 in an endothermic reaction to maintain the temperature of the sample 30. For example, as illustrated in FIG. 1I a cartridge heater may be imbedded into the outer surface of the sample container 20. When in the detached (or non-heating) configuration, the heating element 40 can be de-coupled with the sample container 20 such that the heating element 40 is not in thermal contact with the sample container 20. Accordingly, the heating element 40 does not provide heat to the sample container 20.

Some examples of the calorimeter 10 can include a heating element 40 for positioning in thermal contact with the sample container 20. In some examples, thermal contact may include direct contact. In other examples, thermal contact may be indirect contact. Thermal contact can include any contact, direct and/or indirect, such that heat can be transmitted between the heating element 40 and the sample container 20. For example, when in the attached configuration, the heating element 40 can be positioned in a close thermal contact from the sample container 20 such that the heating element 40 can transmit thermal energy to the sample container 20. To be in close thermal contact, the heating element 40 can be within a threshold distance of the sample container 20. For example, the heating element 40 can be at the threshold distance of less than 2.0 mm of the sample container 20. When in the detached configuration, the heating element 40 can be positioned outside of the threshold distance such that the heating element 40 is not in close thermal contact from the sample container 20, and the heating element 40 does not transmit thermal energy to the sample container 20. For example, threshold distance can be between about 2.0 mm to about 30.0 mm. For example the thresholding distance can be about 2.0 mm to about 2.5 mm, about 2.5 mm to about 3.0 mm, about 3.0 mm to about 3.5 mm, about 3.5 mm to about 4.0 mm, about 4.0 mm to about 4.5 mm, about 4.5 mm to about 5.0 mm, about 5.0 mm to about 5.5 mm, about 5.5 mm to about 6.0 mm, about 6.0 mm to about 6.5 mm, about 6.5 mm to about 7.0 mm, about 7.0 mm to about 7.5 mm, about 7.5 mm to about 8.0 mm, about 8.0 mm to about 8.5 mm, about 8.5 mm to about 9.0 mm, about 9.0 mm to about 9.5 mm, about 9.5 mm to about 10.0 mm, about 10 mm to about 20 mm, or about 20 mm to about 30 mm.

In some examples, when the calorimeter 10 is transitioned to the non-heating configuration, the heating element 40 can be turned off to not provide heat to the sample container 20. In such cases, such as in FIG. 1I, the heating element 40 may not be moved to be detached from the sample container 20, but heat is no longer provided to the sample container 20.

The heating element 40 may transfer heat to a region of the sample 30 in the sample container 20. The thermal contact between the inner surface 44 of the heating element 40 and the sample container 20 may improve heat transfer between the heating element 40 and the sample container 20. The heating element 40 may include a conductive heating element and/or a resistive heating element. In some examples, the heating element 40 can include a ceramic resistive heating element. For example, the heating element 40 can be provide resistance of up to 600 degrees Celsius.

In some examples, the heating element 40 can include a motor-driven conductive heating element that is in thermal contact with the outer surface of the sample container 20 for heat transfer during heating ramp. A heating ramp is when the temperature of a sample 30 and the sample container 40 increases or decreases because of an exothermic or an endothermic reaction respectively. Upon detection of an onset temperature of a thermal runaway, the motion-controlled heating element 40 can be thermally detached from the sample container 20 allowing the runaway reaction to depart from a programmed temperature ramp and self-propel to reaction completion adiabatically.

In some examples, the heating element 40 can include a motion-controlled conductive heating element 40 operable to be in detachably thermal contact with the outer surface of the sample container 20 for heat transfer during heating ramp. When the heating element 40 is in thermal contact with the sample container 20, the heating element 40 can be in close thermal contact with the outer surface of the sample container 20 such that heat can be transferred from the heating element 40 to the sample container 20. Upon detection of an onset temperature of a thermal runaway reaction, the motion-controlled heating element 40 can be in thermal contact with the sample container 20 while reducing the heating power provided to the sample container 20 allowing the reaction to remain at a programmed temperature ramp until the reaction is complete.

In some examples, the movement of the conductive heating element 40 in relation to the sample container 20 as shown in FIGS. 1A-1H can be driven and controlled by a step-motor or linear actuator. In some examples, the linear actuator can include a pulley. The step-motor or linear actuator may cause the heating element 40 to be moved a travel distance to be detached from the sample container 20. The step-motor or linear actuator may control the travel distance of the heating element 40 in relation to the sample container 20. While the disclosure discusses up-and-down vertical movement of the conductive heating element 40 in relation to the sample container 20, in some examples, the sample container 20 can move in addition to or instead of the heating element 40. In some examples, the conductive heating element 40 and the sample container 20 can be moved in other directions relative to one another other than vertically, such as horizontally, diagonally, etc. without deviating from the scope of the disclosure.

In some examples, as illustrated in FIGS. 1G and 1H, the heating element 40 may be pulled upwards away from the sample 30 and the support container 2040. In some examples, the sample 30 and the support container 2040 can be moved downwards away from the heating element 40.

In some examples, the heating element 40 can have a contacting surface area to be in thermal contact with the sample container 20. In some examples, the contacting surface area can be more than 10% of the total external surface area of the sample container 20.

The heating pulses from the heating element 40 may be generated by an energy source. For example suitable energy sources include but are not limited to electricity, heat pumps, ground source heat pumps. The heat rate may be designed to be equal to or around the threshold of exotherm detection limits ranging from about 0.01 to 1K/min. For example, the heat rate may be about 0.01 K/min, about 0.05 K/min, about 0.1 K/min, about 0.2 K/min, about 0.3 K/min, about 0.4 K/min, about 0.5 K/min, about 0.6 K/min, about 0.7 K/min, about 0.8 K/min, about 0.9 K/min, or about 1 K/min. Applying a higher heat rate power to the attach/detach conductive heater 40 may increase the detected onset temperature and may achieve much shorter test duration.

As shown in at least one example in FIGS. 1A and 1C, when the heating element 40 is in the attach position, the inner surface 44 of the heating element is in thermal contact with the sample container 20, and the heating element 40 is in a heating configuration when the heating element 40 provides heat to the sample container 20.

As shown in FIGS. 1B, 1D, 1F, 1H, the heating element 40 is in the detach position such that the inner surface 44 of the heating element is in not in thermal contact with the sample container 20, and there is a gap between the recess receiving portion 42 and the sample container 20. As shown in FIGS. 1B, 1D, 1F, 1H, the heating element 40 is in a non-heating configuration such that the heating element 40 is not transferring heat or is transferring less heat to the sample container 20.

Some examples of the calorimeter 10 can include a first temperature sensor 70 for sensing the temperature of the heating element 40, a second temperature sensor 80 for sensing the temperature of the sample 30, and a temperature controller 114 communicatively coupled with both the first 70 and the second temperature 80 sensors. The temperature controller 114 is configured to measure the temperature of the two temperature sensors to determine a baseline (e.g., a linear temperature ramp). The temperature controller 114 is further configured to maintain a programmed linear temperature scanning rate by providing adequate heating power to the heating element 40. The temperature controller 114 can be operable to maintain a linear temperature ramp rate up to a detection threshold and/or throughout an entire thermal event.

When the heating power signal deviates from the baseline and surpasses the detection threshold, the controller 114, 116 can be operable to determine that the thermal event is a thermal runaway or a thermal reaction. A thermal reaction can include an endothermic event and/or an exothermic event.

When the thermal event is determined to be a thermal reaction, the heating element 40 can be operable to remain in the heating configuration to be thermally attached with the sample container 20 throughout the entire course of the thermal event. In at least one example, upon detection of an onset temperature of the endothermic event or the exothermic event, the heating element 40 can be operable to reduce the heating power and the heat transferred to the sample container 20 to substantially sustain a linearity of a temperature ramp until the thermal event is complete.

When the thermal event is determined to be a thermal runaway, the conductive heating element 40 is transitioned to the non-heating configuration, for example by detaching from the sample 30 and/or sample container 20, and/or the electric heating is terminated to allow the sample 30 to the self-propelled thermal runaway. For example, the motion controller 116 can be further configured to cause the heating element 40 to be decoupled away (e.g., detached or separated) from the sample container 20 allowing the heating power to depart from a programmed temperature ramp and self-propel to reaction completion. In at least one example, the motion controller 116 can be operable to determine the relative distance between the sample container 20 and the heating element 40 and determine whether the sample container 20 and the heating element 40 are in the close thermal contact. In some examples, the heating element 40 may be kept in thermal contact with the sample container and no longer providing heat to the sample container, allowing the heating power to depart from a programmed temperature ramp and self-propel to reaction completion. For example, the heating element 40 may be turned off.

Some examples of the calorimeter 10 can include a first temperature sensor 70 for sensing the temperature of the heating element 40, a third temperature sensor 60 for sensing the temperature of the sample container 20, and a temperature controller 114 communicatively coupled with both the first temperature sensor 70 and the third temperature sensor 60 to determine a baseline (e.g., a linear temperature ramp) based on the temperature of the heating element 40 and the temperature of the sample container 20. The temperature controller 114 is further configured to keep a programmed linear temperature scanning rate by providing adequate heating power to the heating element 40. When the heating power signal deviates from the baseline and surpasses the detection threshold, the conductive heating element 40 is detached from the sample container 20, and/or the electric heating is terminated to allow the sample container 20 to the self-propelled thermal runaway. The motion controller 116 is further configured to cause the heating element 40 to be decoupled away from the sample container 20. In at least one example, the motion controller 116 can be operable to determine the relative distance between the sample container 20 and the heating element 40 and determine whether the sample container 20 and the heating element 40 are in the close thermal contact.

In some examples, the heating element 40 is machined such that the shape of the recess receiving portion 42 and/or the internal surface 44 can be modified to correspond, fit, coincide, and/or match to an external surface of any sample container 20.

In some examples, the heating element 40 may also be supported by a thermally non-conductive rod 90, wherein the thermally non-conductive rod has an upper end 92 and a lower end ff. The thermally non-conductive rod may be made of ceramics, composites, glass, and/or any non-metallic materials. In some examples, the thermally non-conductive rod 90 is coupled with a driving screw. The upper end of the thermally non-conductive rod 92 can be connected to the heating element 40. The lower end 94 of the thermally non-conductive rod 92 can be connected to the motion controller 116. The thermally non-conductive rod 92 can help attach and/or detach the heating element 40 from the sample container 20.

In some examples, the lower end 94 of the rod 90 can be supported via a spring coil to keep the heating element 40 in close contact with the sample container 20. In other examples, the heating element 40 can include a resistive heating element.

Figure 2:
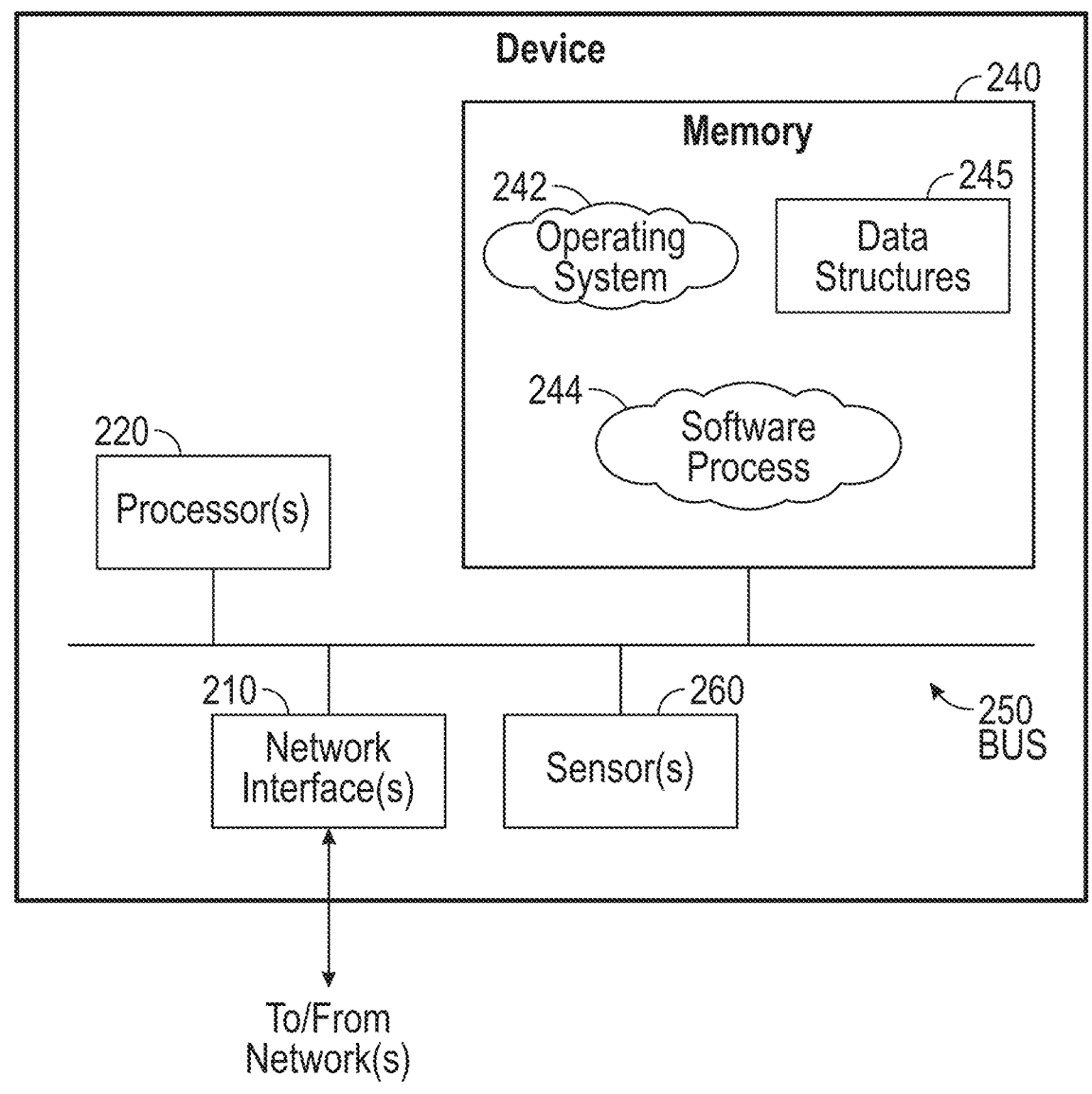
FIG. 2 is a schematic diagram of a controller which may be employed as shown in FIGS. 1A-1D.

FIG. 2 is a block diagram of an exemplary temperature controller 114 and/or motion controller 116. Temperature controller 114 and/or motion controller 116 is configured to perform processing of data and communicate with the sensors 60 and 70 and the heating element 40 respectively, for example as illustrated in FIGS. 1A-1D. In operation, temperature controller 114 and/or motion controller 116 communicate with one or more of the above-discussed components and may also be configured to communication with remote devices/systems.

As shown, temperature controller 114 and/or motion controller 116 include hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260 typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, or other parameters.

Memory 240 comprises a plurality of storage locations that are addressable by processor 220 for storing software programs and data structures 245 associated with the examples described herein. An operating system 242, portions of which may be typically resident in memory 240 and executed by processor 220, functionally organizes the device by, inter alia, invoking operations in support of software processes and/or services 244 executing on temperature controller 114 and/or motion controller 116. These software processes and/or services 244 may perform processing of data and communication with temperature controller 114 and/or motion controller 116, as described herein. Note that while process/service 244 is shown in centralized memory 240, some examples provide for these processes/services to be operated in a distributed computing network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Additionally, the temperature controller 114 or motion controller 116 can apply machine learning, such as a neural network or sequential logistic regression and the like, to determine relationships between the reflected signals from the temperature received from the sensors 60, 70, and 80 and heating power of the heating element 40.

In some examples, the present disclosure is also directed to a method for initiating thermal runaway in a sample container. The method includes sensing the temperature of the sample; placing a moving heating element in thermal contact with the sample container for transferring heat to the sample container; placing a conductive heat transfer material between and in contact with both the heating element and the sample container to assist with thermal energy transfer between the heating element and the sample container; providing an energy source electrically coupled to the heating element; and sending a current pulse through the heating element to generate power pulses at the heating element to heat the sample to initiate thermal runaway.

In some examples, the power pulses generate a peak heat flux density at the heating element 40 of at least 50 kW/m². For example, the peak heat flux density may be at least 55 kW/m², at least 60 kW/m², at least 65 kW/m², at least 70 kW/m², at least 75 kW/m², at least 80 kW/m², at least 85 kW/m², at least 90 kW/m², at least 95 kW/m², or at least 100 kW/m².

In some examples, the method may further comprise sensing the heating element power of the heating element 40 and controlling the heating element power of the heating element 40 such that the heating element 40 is heated according to a predetermined temperature rate or held at a predetermined temperature in response to the sensing of the temperatures and temperature difference of the heating element 40 and the sample container 20 and/or the sample 30.

The heating element power may be controlled by pulse-width modulation (PWM). Pulse-width modulation is a method of controlling the average power or amplitude delivered by an electrical signal.

Figure 3:
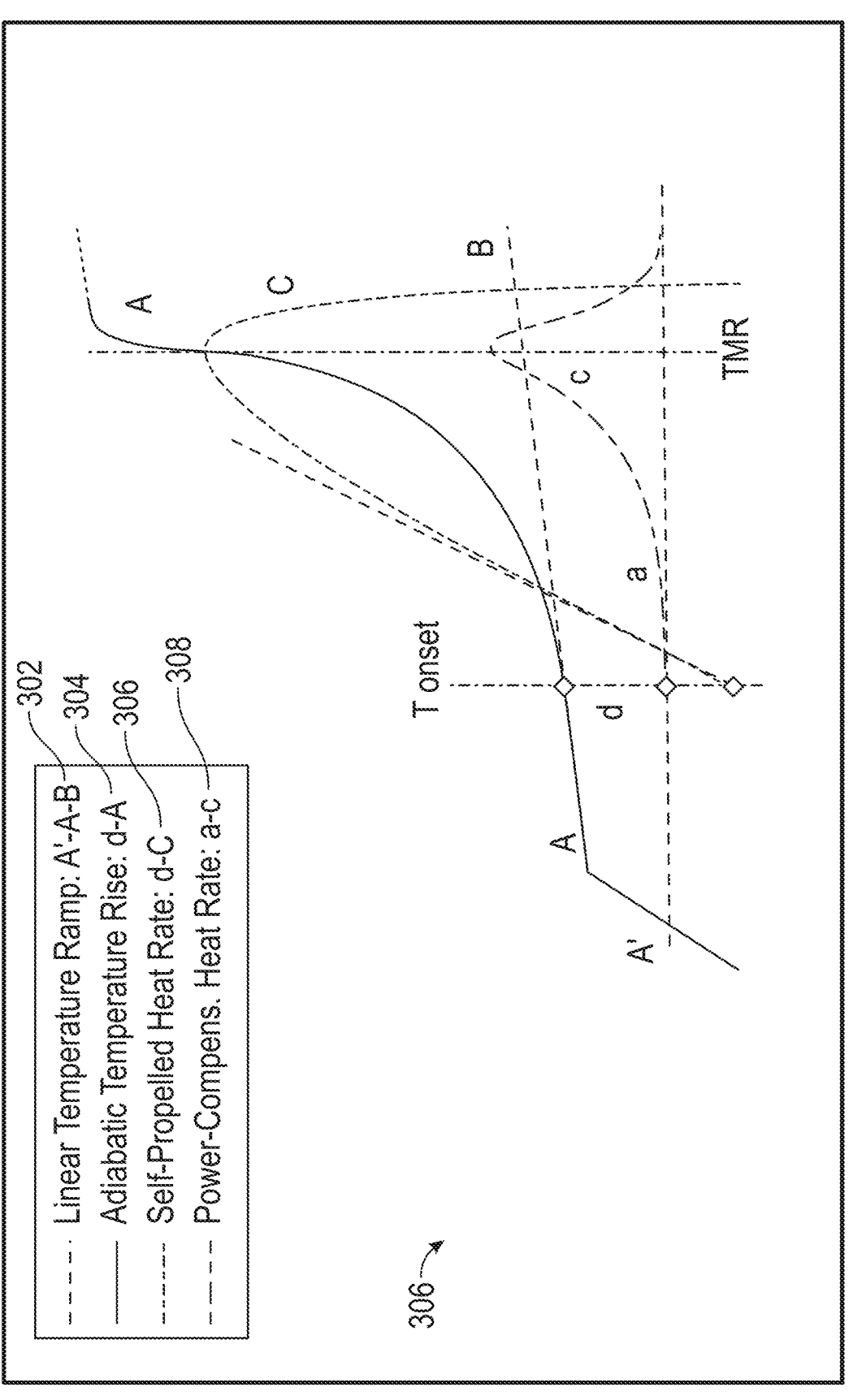
FIG. 3 illustrates an example graph of a runaway temperature-time thermogram (curve A'-d-A), temperature-rate (curve C) thermogram, and non-differential scanning calorimetric thermograms (curves A'-d-B and a-c) caused by a heating element of an apparatus for initiating thermal runaway being in contact with a sample container.

FIG. 3 illustrates an example graph of a runaway temperature-time thermogram (curve A'-d-A), temperature-rate 302 (curve C) thermogram, and differential scanning calorimetric thermograms (curves A'-d-B and a-c). The data is collected from an apparatus for initiating thermal runaway with a heating element 40 in thermal contact with a sample container 20. When a thermal runaway is detected at the point d, the heating element 40 transitioning between the heating configuration and the non-heating configuration depends on what the test mode is used. For instance, as shown in FIG. 3 with the a-c DSC mode and the A'-A ADSC, the removable heating element 40 is always in the heating configuration providing heat to the sample 30 and/or sample container 20, keeping a linear ramp thru the end of reaction or thermal event. While as shown in the FIGS. 4 and 6, as a thermal event detected at the point d with the A-d-B mode, the heating element 40 configuration depends on the user's test setup, when the heating element 40 is set to non-heating configuration upon detection d, the sample system proceeds to a thermal runaway thru a self-heating and self-propelled mechanism. When the heating element 40 is set in the heating configuration and providing heat, upon detection d, the system will follow the A'-A ADSC mode in FIG. 3.

Figure 4:
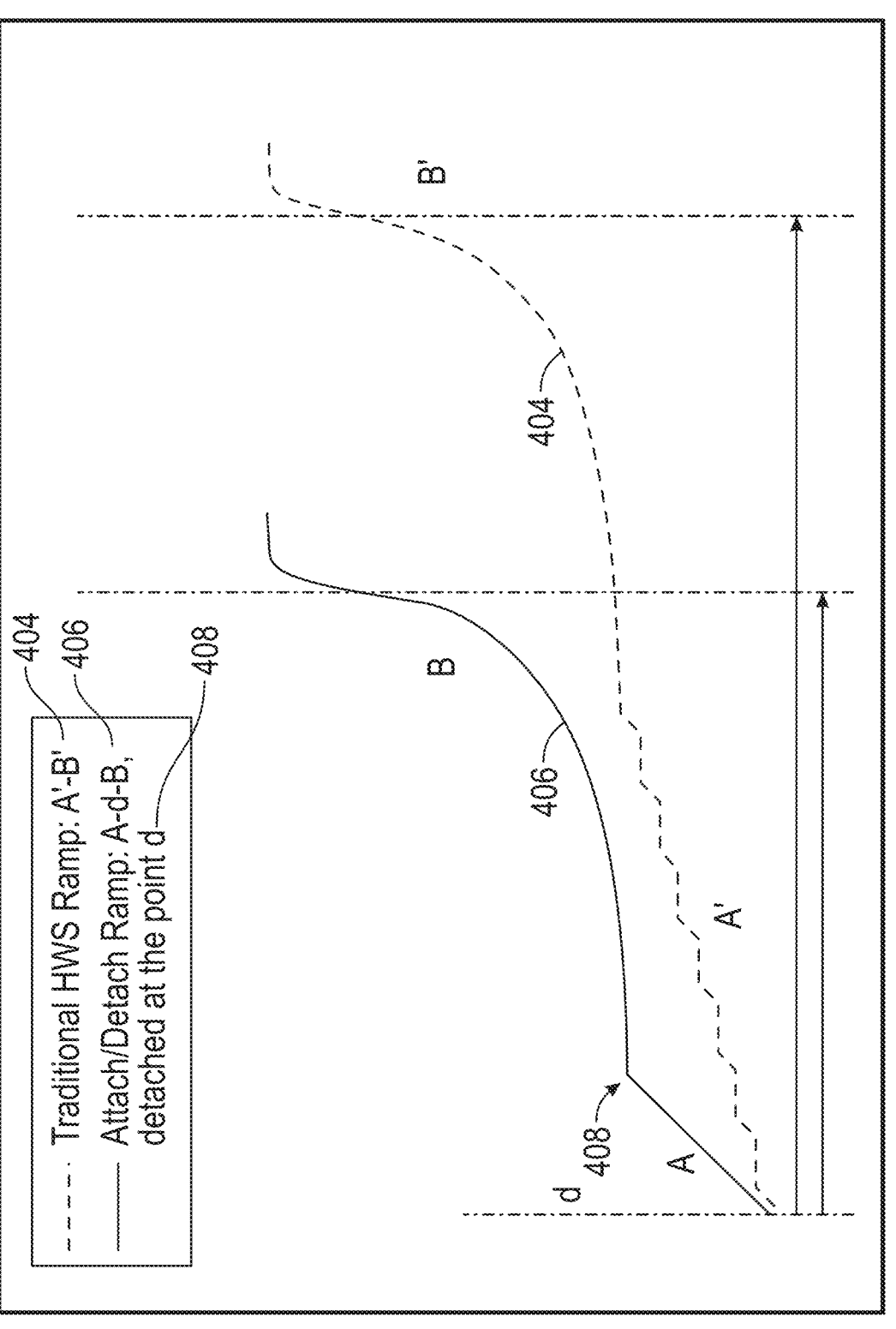
FIG. 4 illustrates an example graph of accelerating rate thermograms.

FIG. 4 illustrates an example graph of accelerating rate thermograms in a touch accelerating rate calorimeter 406 and a conventional accelerating rate calorimeter 404, in accordance with some samples. The test duration using the disclosed touch accelerating rate calorimeter is significantly reduced compared to the conventional ARC or dARC because the slow HWS portion of the test is eliminated.

Figure 5:
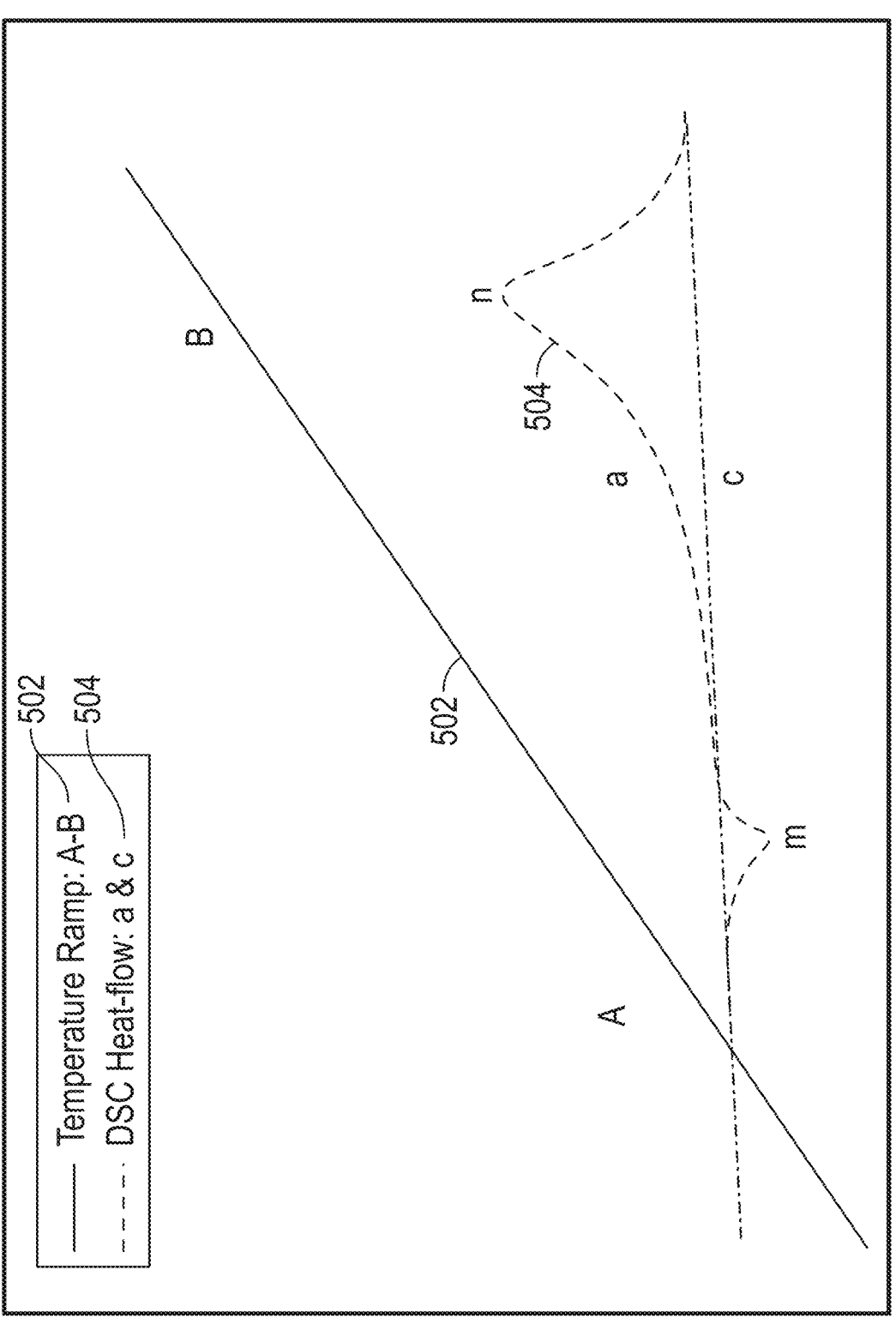
FIG. 5 illustrates an example graph of differential scanning calorimetric thermograms (curves A-B and a-c) in a sample in power-compensation mode.

FIG. 5 illustrates an example graph of differential scanning calorimetric thermograms (curves A-B 502 and a-c 504) in a sample in power-compensation mode. The heats of endothermic and exothermic reactions can be determined dynamically, using the Attached-Ramp test scheme, showing an endothermic reaction peak (m) and a consecutive exothermic reaction peak (n).

Figure 6:
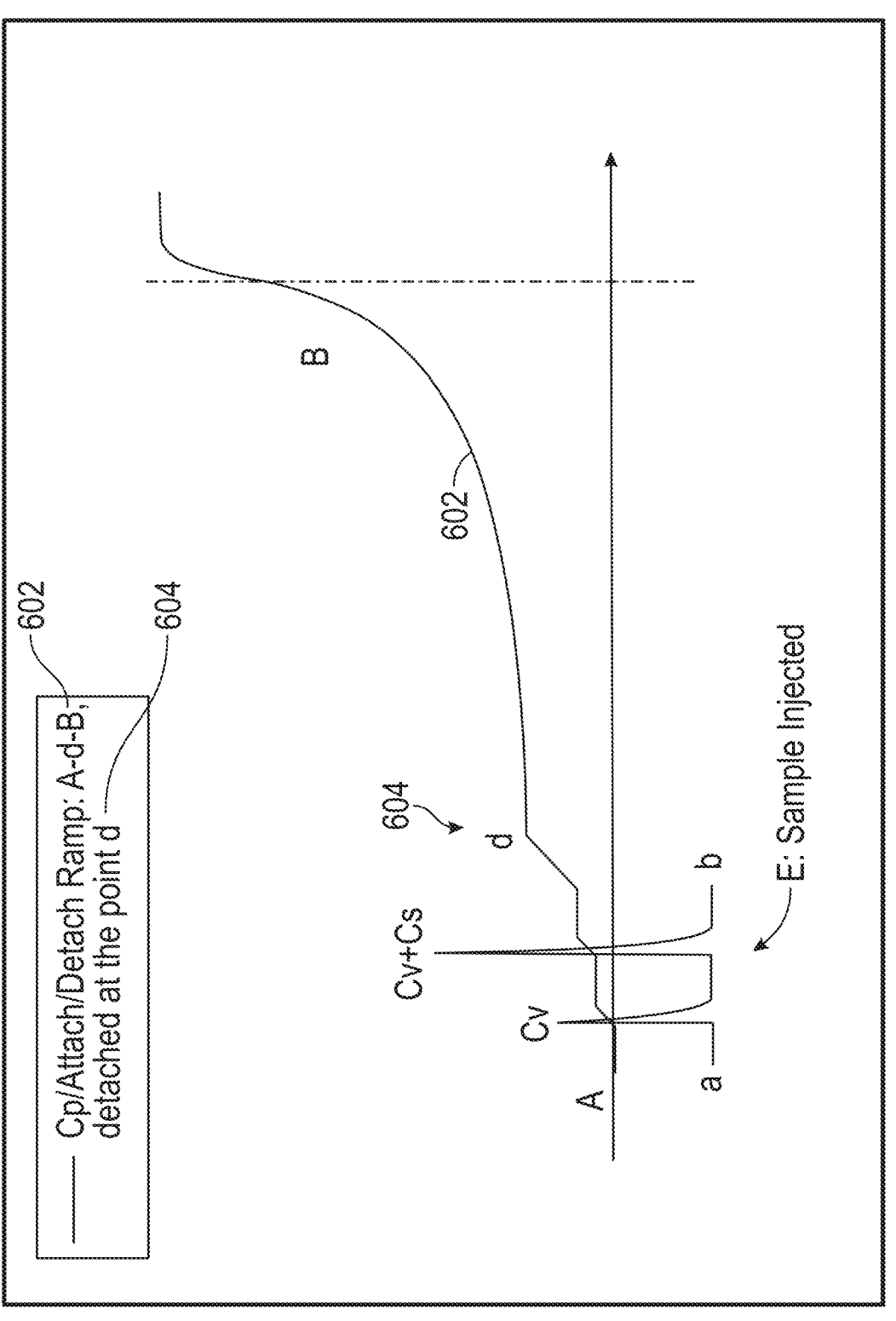
FIG. 6 illustrates an example graph from a single calorimetric test for measuring sample heat capacity and initiating thermal runaway.

FIG. 6 illustrates a graph from a single calorimetric test for measuring sample heat capacity and initiating thermal runaway using the disclosed calorimeter. The heat capacities of sample and container can be determined quickly by two short ramp experiments (a-b) 602, using the Attached-Ramp test scheme.

In FIGS. 3-6, the x-axis is either time or temperature and the y-axis is either programmed temperature rate (° C./min) or heat rate (° C./min or mW).

The advantages of an attach/detach heating adiabatic calorimeter (A/D AC) and method of use of the A/D AC of the present disclosure include the following. First, the test duration is significantly reduced since the slow HWS portion of the test is eliminated, using the Attached Ramp-N-Detached Reaction test process as illustrated in FIG. 4. The heats of endothermic and exothermic reactions can be determined dynamically by compensating heating power of the electric heater, using the Attached-Ramp test process as illustrated in FIG. 5. Lastly, the heat capacities of sample and container can be determined quickly by two short ramp experiments, using the Attached-Ramp test process as illustrated in FIG. 6.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

What is claimed is:

1. An apparatus for initiating thermal event in a sample container, the apparatus comprising:

a heating element operable to transition between a heating configuration and a non-heating configuration, wherein when the heating element is in the heating configuration, the heating element is operable to be in thermal contact with the sample container to transfer heat to a region of the sample container;

a sample temperature sensor operable to sense a sample temperature of the sample; and a controller communicatively coupled with the sample temperature sensor and the heating element, wherein the controller is operable to maintain a linear temperature scanning rate up to a detection threshold and/or throughout the thermal event;

wherein the controller is operable to determine, when a heating power regulated by the controller surpasses the detection threshold, that the thermal event is a thermal runaway or a thermal reaction, wherein, when the thermal event is a thermal runaway, the heating element is transitioned to a non-heating configuration such that the heating element is not providing heat to the sample container, wherein, when the thermal event is a thermal reaction, the heating element remains in the heating configuration to be thermally attached with the sample container throughout the entire course of the thermal event, wherein the heating element is coupled with a thermally non-conductive component, wherein the thermally non-conductive component has an upper end and a lower end, and wherein the thermally non-conductive component comprises of ceramics, composites, glass, or any non-metallic materials.

2. The apparatus of claim 1, wherein the heating element includes a motion-controlled conductive heating element in thermal contact with an outer surface of the sample container to transfer the heat during a heating ramp;

wherein upon detection of an onset temperature of the thermal runaway, the motion-controlled conductive heating element is detached from the sample container allowing the runaway reaction to depart from a programmed temperature ramp and self-propel to reaction completion adiabatically.

3. The apparatus of claim 1, wherein the thermal reaction includes an endothermic event and/or an exothermic event, wherein upon detection of an onset temperature of the endothermic event or the exothermic event, the heating element is operable to reduce the heating power and the heat transferred to the sample container to substantially sustain a linearity of a temperature ramp until the thermal event is complete.

4. The apparatus of claim 1, wherein upon detection of an onset temperature of the thermal runaway, the heating element is kept in thermal contact with the sample container and no longer providing heat to the sample container, allowing the heating power to depart from a programmed temperature ramp and self-propel to reaction completion.

5. The apparatus of claim 1, wherein upon detection of an onset temperature of the thermal runaway, the heating element is detached or separated from the sample container allowing the heating power to depart from a programmed temperature ramp and self-propel to reaction completion.

6. The apparatus of claim 1, wherein when the heating element transitions from the heating configuration to the non-heating configuration, the heating element is turned off.

7. The apparatus of claim 1, wherein when the heating element transitions from the heating configuration to the non-heating configuration, the heating element is moved a travel distance to be detached from the sample container.

8. The apparatus of claim 7, wherein the heating element is driven and controlled by a step-motor and/or a linear actuator, wherein the step-motor and/or the linear actuator controls the travel distance of the heating element.

9. The apparatus of claim 1, wherein the thermally non-conductive component is coupled with a driving screw.

10. The apparatus of claim 1, wherein the lower end of the thermally non-conductive component is supported via a springe coil so to keep the heating element, when in the heating configuration, in thermal contact with the sample container.

11. The apparatus of claim 1, wherein the heating element includes a resistive heating element.

12. The apparatus of claim 1, wherein when the heating element is in the heating configuration, the heating element is coupled in thermal contact with the sample container.

13. The apparatus of claim 1, further comprising a conductive heat transfer material that is configured to, when the heating element is in the heating configuration, be in contact with both the heating element and the sample container, the conductive heat transfer material operable to assist with thermal energy transfer between the heating element and the sample container.

14. A method for initiating a thermal event in a sample container, the method comprising:

positioning a heating element to be in thermal contact with the sample container for transferring heat to the sample container;

providing an energy source electrically coupled to the heating element; and sending one or more current pulses through the heating element to generate power pulses at the heating element to heat the sample to initiate the thermal event;

determining, when a heating power surpasses the detection threshold, that the thermal event is a thermal runaway or a thermal reaction, when the thermal event is a thermal runaway, transitioning the heating element to a non-heating configuration such that the heating element is not providing heat to the sample container, when the thermal event is a thermal reaction, maintaining the heating element in a heating configuration to be thermally attached with the sample container throughout the entire course of the thermal event, wherein the heating element is coupled with a thermally non-conductive component, wherein the thermally non-conductive component has an upper end and a lower end, and wherein the thermally non-conductive component comprises of ceramics, composites, glass, or any non-metallic materials.

15. The method of claim 14, further comprising:

positioning a conductive heat transfer material between and in contact with both the heating element and the sample container to assist with thermal energy transfer between the heating element and the sample container.

16. The method of claim 14, further comprising:

sensing a sample temperature of the sample;

controlling the heating element such that the heating element is heated according to a predetermined temperature rate or held at the predetermined temperature in response to a temperature difference of the heating element and the sample.

17. The method of claim 16, wherein pulse-width-modulation is used to control the heating element power of the heating element.

18. The method of claim 15, wherein the thermal event includes a thermal runaway and/or a thermal reaction.

19. The method of claim 18, wherein the thermal reaction includes an endothermic event and/or an exothermic event.

\* \* \* \* \*